Patented Sept. 26, 1922.

1,430,477

UNITED STATES PATENT OFFICE.

JOHN K. TULLIS, OF NEW YORK, N. Y., ASSIGNOR TO FULCRA TAN COMPANY, OF IRVINGTON, NEW JERSEY, A CORPORATION OF DELAWARE.

TANNING PREPARATION.

No Drawing.   Application filed March 25, 1920. Serial No. 368,728.

*To all whom it may concern:*

Be it known that I, JOHN K. TULLIS, a subject of the King of Great Britain, and a resident of New York city, in the county of New York and State of New York, have invented certain new and useful Improvements in Tanning Preparations, of which the following is a specification.

This invention relates to tanning preparations; and it comprises as a new material for tanning purposes a solution of commercial quebracho extract (or like tanning extracts) in somewhat acid sulfite waste liquor of the nature of that delivered by sulfite pulp digestors, or the so called light liquor, the acidulation being advantageously effected by addition of a sulfonic acid containing an aromatic group; all as more fully hereinafter set forth and as claimed.

Commercial quebracho extract as it occurs in commerce in this country is a dry or substantially dry preparation much used in tanning. For tanning it is preliminarily brought into solution with water in the proper amount to form a tanning liquor of the desired strength in tanning components. It is however not clearly soluble in water and on solution and dilution it gives a turbid liquor, not all the components of the quebracho extract going into solution. This formation of a turbid liquor is undesirable, both because of the turbidity and because all the tanning components are not freely available. Various additions to the water for the purpose of promoting clear solution have been employed, but for one reason or another their use is not desirable, this being particularly true of the use of sodium sulfites.

In the present invention in lieu of using water to dissolve the quebracho extract I employ waste sulfite liquor of about the density it comes from the paper pulp digestors, say about 5° Baumé. In making paper pulp by the sulfite process wood is heated with a solution of an acid sulfite, generally acid sulfite of lime (calcium hydrogen sulfite) under pressure. About half the wood goes into solution and about half remains undissolved as cellulose. The portion which goes into solution unites with the acid sulfite (which thereby loses its identity as such), forming new complex organic bodies of unknown constitution. These bodies are often called, for the sake of a name "lignosulfonates," on the theory, which is borne out by some of the facts, that sulfurous acid has gone into organic combination to form sulfonates. The liquor discharged from the digestor is usually called "light liquor" to distinguish it from various evaporated preparations made therefrom which are on the markets.

The light liquor as it leaves the digestor is generally quite acid in its reaction but this acidity is due to acetic acid and other organic acids rather than to sulfurous acid; most of the sulfurous acid in the acid sulfite solution placed in the digestor having disappeared as such, either in vented gases or by going into organic combination. Of actual sulfurous acid, present either as such or in the form of sulfites, there is generally, in fresh liquor, merely a trace present; say 0.06 or 0.07 per cent. Various efficient tanning agents can be made from the light liquor by concentration and other treatment; but the light liquor as it comes from the digestor and without treatment has but little tanning value.

I have found that this light liquor is an efficient solvent for quebracho extract, giving a clear solution evincing the full tanning value of the quebracho. As a matter of fact it has somewhat more, the tanning value of the preparation made by dissolving a given amount of quebracho extract in light liquor having somewhat more than the sum of the tanning values of its components. The tanning action is very much quicker than that of the same grade of quebracho dissolved in water. Apparently some of the latent tanning value of the light liquor is made available.

As to the reason for the solvent power of the light liquor on the quebracho extract I am not aware. It is not the presence of sulfites in such liquor, there being, substantially, as stated, none. Nor am I aware of the reason for the development of further tanning value in the solution so made.

I find that it is often desirable to further acidulate the light liquor; though this depends more or less upon the particular light liquor used. Various acids may be used but I find it most advantageous to use one of the various commercial sulfonic acids containing an aromatic group, such as a cresol or cresyl sulfonic acid, a naphthalene or naphthol sulfonic acid, etc. These sulfonic acids appear to function better for my purposes than most other acids. They work better, for example, than sulfuric acid. About 5 per cent of a commercial sulfonic acid, with most light liquors, is a desirable proportion.

The amount of light liquor to be used with the quebracho extract, of course, varies according to the strength of the final tanning liquor desired, the quality of the quebracho extract, etc.; but generally I use about 1 part by weight for each part of commercial quebracho extract. With this mixture may be used about 5 per cent of a sulfonic acid. By warming up the mixture I obtain a clear, somewhat decolorized liquid tanning extract which can be diluted to any strength desired by addition of water without precipitation of tans.

The acid light liquor may also be used as a solvent for various other commercial concentrated tanning extracts, such as mangrove, mimosa, valonea, cutch, etc., with much of the same advantage. But I find it particularly desirable for quebracho.

What I claim is:—

1. As a new tanning material a solution of commercial quebracho extract in a somewhat acid light liquor from sulfite digestors used in making paper pulp.

2. As a new tanning material a solution of commercial quebracho extract in acidulated light liquor from sulfite digestors used in making paper pulp, the acidulation being with a sulfonic acid.

3. In a tanning material, light sulfite waste liquor from sulfite digestors used in making paper pulp, said light liquor being acidulated with a sulfonic acid containing an aromatic group.

In testimony whereof, I affix my signature hereto.

JOHN K. TULLIS.